United States Patent Office 2,955,753
Patented Oct. 11, 1960

2,955,753

CONTROL APPARATUS

Frank O'Conor, Moline, Clyde K. Henninger, Geneseo, and William C. Smith, Moline, Ill., assignors to American Machine and Metals, Inc., New York, N.Y., a corporation of Delaware Filed May 3, 1957, Ser. No. 656,937

11 Claims. (Cl. 233—4)

This invention relates to apparatus for conditioning drilling mud and particularly to a control system therefor.

Drilling mud or fluid is commonly employed in rotary drilling operations, the mud having a number of functions to perform as is known in the art. These functions include lubrication of the rotary drill bit, removal of cuttings, and overcoming formation pressures in the hole being drilled. In addition to these aspects, the mud also must deposit an impermeable wall cake and control the settling of cuttings in the hole. With the great increase in depths of wells and the problems of bottom hole temperature and pressure, drilling mud plays a large part in successful completion of a well. As an example, $50,000 to $75,000 worth of mud may be needed to start drilling and the cost of the mud required may be as high as $250,000 for a hole. The drilling mud must be circulated in the proper volume and must have the correct viscosity and weight to accomplish the aforementioned functions efficiently. Also, the amount of drilled solids in the mud must be properly regulated. Chemical treatment for control of the solids has not been completely satisfactory and neither has merely adding water solved it. When certain clays are mixed with water, hydration results and an increase in viscosity occurs. Merely removing solids to reduce viscosity is insufficient because then it becomes necessary to add weighting materials for particular drilling operations. The light weight solids must be separated from the heavier solids. Barium sulphate or barite is commonly used as a weighting material and in some areas one of the principal considerations in treatment of mud is that of saving barium sulphate.

One of the objects of the invention is to provide an apparatus for controlling the characteristics of the drilling mud being used so that it will have the desired viscosity, weight and solids content.

Another of the objects of the invention is to provide an arrangement for controlling the condition of drilling mud in a manner that will conserve the more expensive ingredients.

A still further object of the invention is to control drilling mud by a classification separation of the solids in the mud.

Still another object of the invention is to provide an arrangement whereby the system can be started and stopped in the proper sequence.

The mud is controlled in response to the condition thereof in the apparatus in which it is treated for classification or separation. In one aspect of the invention, mud is conditioned by a centrifugal classification or separation of solids, a conventional solids-liquid separator or classifier of the centrifugal type or decanting type being used, such being horizontal with an outer bowl or beach and an inner conveyor or rotating element. The conical outer bowl or beach is driven at a desired speed and the conical shaped conveyor is associated with the outer bowl through a suitable differential or variable drive arrangement, such as a gear arrangement, the input shaft of the differential drive arrangement being connected to a driving mechanism, such as a fluid motor drive, the fluid motor in turn being driven by a fluid pump. The pressure generated by the fluid pump and motor system will be proportional to the torque or load on the conveyor.

The mud to be treated is fed to the solids-liquid separator at one end thereof as is also the water. As mud and liquid are fed into the separator, the heavier parts will be deposited on the interior of the rotating outer bowl and will be moved by the conveyor along the bowl to the smaller end thereof as is known. The liquid with its solids will move to the larger end of the bowl and be discharged therefrom, such being a classification operation dependent upon speed and rate of conveying the solids.

The fluid pressure generated by the pump is used to operate a control arrangement, preferably pneumatic, for operating two valves, one controlling the flow of water to the separator and the other the flow of mud to the separator or to the mud tank. The valves are arranged so that when the hydraulic pressure of the pump and motor system increases due to an increased conveyor torque, the proportion of water relative to mud fed to the separator will increase. In one form, as the water valve is turned to supply more water, the mud valve is turned so as to reduce supply of mud to the separator. The mud valve can be arranged so that as it is opened, more mud will be bypassed to the mud tank thereby reducing supply of mud to the separator.

In another form, the valves can be operated separately by the controller, the mud feed being controlled by pressure from the torque and the same pressure used to control the water directly in a one-to-one proportion or in inverse proportion.

As will be set forth hereafter, the electric circuits can be arranged to start up the various pumps and shut them off in a predetermined sequence.

These and other objects, advantages, and features of the invention will become apparent from the following description and drawings which are merely exemplary.

In the drawings:

Fig. 5 is a fragmentary sectional view of the water and mud inlet.

The invention will be described in conjunction with a conventional horizontal solid liquid rotary separator or classifier.

Figure 1:
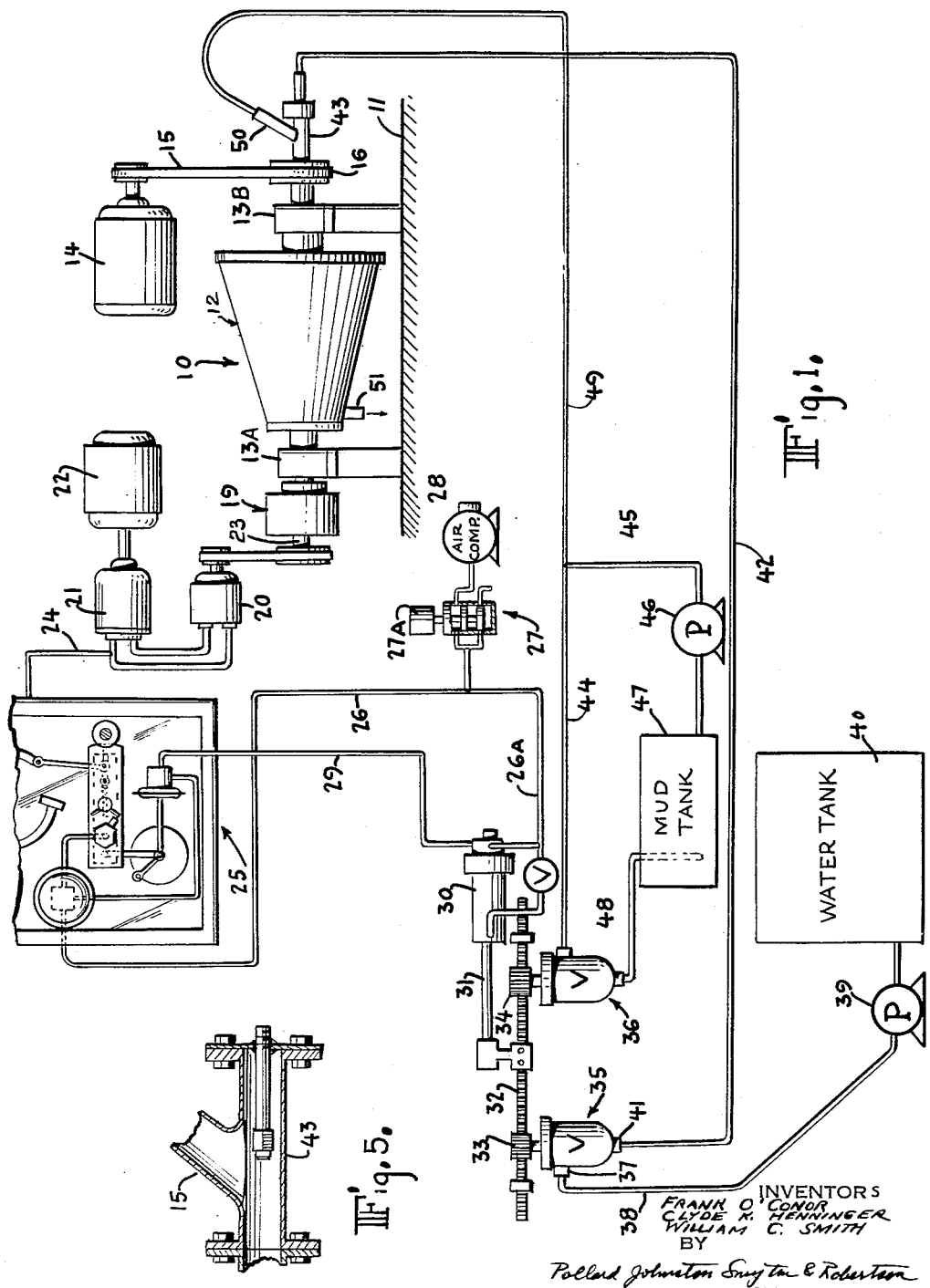
Fig. 1 is a schematic view of one arrangement of the invention.

Referring to Fig. 1, the separator or classifier 10 can be mounted on a suitable base 11, the outer bowl or beach 12 being carried by bearings 13A, 13B, said beach being driven by a suitable motor 14 through belt 15 and pulley 16. The conveyor (not shown) within beach 12 can be driven by a shaft (not shown), the speed thereof and the speed relative to beach 12 being controlled by a suitable differential drive arrangement 19, which in turn is operated by a fluid motor system including a variable delivery fluid pump 21 and a constant displacement fluid motor 20. Motor 22 can be used to drive pump 21. The fluid motor drives the input shaft 23 of the differential unit 19, variation of pump delivery, varying the fluid motor speed, and thus controlling the differential speed between the beach 12 and the conveyor.

Since the fluid drive will have constant torque characteristics, the torque of the drive will be that required for conveying solids along the beach and will be directly proportional to the pressure in the fluid system. This pressure is connected through line 24 to pneumatic controller 25. Pneumatic controller 25, for example, can be similar to that shown in Patent No. 2,770,247, although other types of controller can be used.

Air can be supplied to the controller 25 by line 26 through the four-way solenoid operated valve 27 from the air compressor or supply 28. The output pressure from controller 25 can be fed through pipe 29 to a suitable valve operating means or valve controller 30, such as that sold under the trademark "Conoflow."

The valve control means 30 may be of the piston-type having an internal pilot arrangement therein. When air is fed to said valve controller 30, arm 31 will be operated in accordance with the control or output pressure, increase in pressure moving arm 31 to the left. If operating air is cut off, arm 31 will move to the left to an inoperative position, such depending upon the particular valve used and its arrangement. Operating air is fed to the valve controller 30 through line 26A. Other types of suitable valves may be used. Also, separate valves (not shown) can be used, such being operatable by individual air motors. In the embodiment shown, arm 31 is connected to rack 32 which in turn meshes with valve gears 33 and 34. Gears 33 and 34 are connected to their respective valves 35 and 36 for opening and closing the same. Valves 35 and 36 may be of the type sold under the trademark "Kates" or any other suitable valve.

Valve 35 has its inlet 37 connected to pipe 38 leading from water pump 39, water pump 39 having its inlet connected to water tank 40 or a source of water supply. Outlet 41 of the water valve 35 has a pipe 42 connecting the same to inlet 43 of the separator. When rack 32 is moved to the left in response to an increase in torque, valve 35 is arranged to open so as to increase water flow from the water pump 39 into separator 10.

Mud valve 36 has its inlet connected through pipe 44 with the outlet 45 from mud pump 46. The outlet of valve 36 serves as a mud by-pass as will be described hereafter and is connected to mud tank 47 by line 48. The mud pump also is connected through line 49 with branch 50 feeding mud into the classifier 10.

Describing generally the control of mud and water to the classifier, when torque increases, due to solids in the classifier, the pneumatic instrument 25 will respond and increase air pressure to valve controller 30 so as to move rack 32 to the left. This will permit more water to flow through line 42 and at the same time, mud valve 36 will be opened which will permit by-passing of mud back to the mud tank, thereby reducing mud supply to the classifier. Thus, torque is used to cause a higher proportion of water to mud being fed to the classifier, and the operation and speeds can be so related that the desired amount of clay and barium sulphate or barite will be discharged from the solids discharger 51 of classifier 10 as is known in the art.

It is desirable to automatically operate the arrangement during the starting cycle and during the stopping operation. If the proper sequence is not followed, the machine may clog and cause difficulty when it is to be started the next time.

Figure 2:
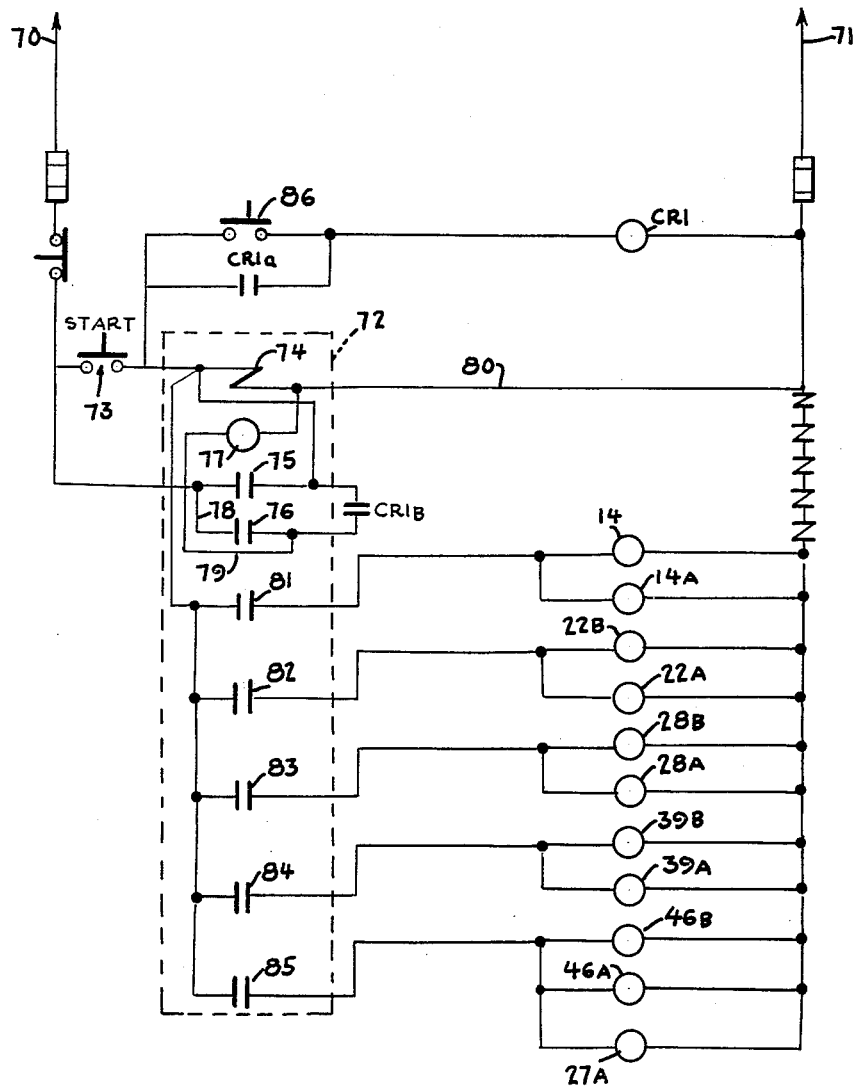
Fig. 2 is a wiring diagram which can be employed in conjunction with the apparatus of Fig. 1.

One form of circuit is seen in Fig. 2, wherein a control arrangement can be connected to power leads 70, 71. A suitable timer mechanism is indicated in box 72, such being, for example, similar to that sold under the name "Multiflex." Such a timer has a timer motor connected to the various switch operators or contacts through a clutch coil, there being a spring arranged to return the switch operators to an initial or zero position when the clutch coil is de-energized.

When it is desired to start the apparatus after it has been connected together as seen in Fig. 1, start button 73 can be pressed and this will energize clutch coil 74 of the timer which will close normally open contacts 75 and 76 so as to energize timer motor 77. Timer motor 77 is energized from line 70, line 78, closed contact 76, line 79, motor 77, line 80, to line 71. Contacts 81 will be immediately closed by the timer arrangement to energize the main drive motor starting coil 14A and main drive motor 14.

As the timer motor continues its operation, the normally open contacts 82 next will close so as to energize starting coil 22A for the variable speed or differential drive pump 22. Contacts 83 thereafter will close to energize starting relay 28A to start air compressor motor 28. Switch contacts 84 then will close to energize the starting coil 39A for the water pump motor 39. Closing of contacts 85 will energize starting coil relay 46A for starting mud pump motor 46. At the same time, solenoid 27A of the four-way valve 27 will be energized so as to permit air from the air compressor or supply to be fed to the pneumatic controller 25 (Fig. 1).

After the last of the contacts has been closed, contact 76 will be reopened so as to stop timer motor 77, the clutch remaining energized so that all of the other contacts remain closed, the mud treating unit continuing operation.

When it is desired to stop the unit, shut-down button 86 can be depressed which will energize relay coil CR1 and this will close contacts CR1a to provide a holding circuit around 86 and to close contacts CR1b. Upon closing of contacts CR1b, the timer motor again will be energized from line 70, closed contacts 75, closed contacts CR1b, line 79, motor 77, line 80, to line 71. The contacts are set so that 85 first will open to de-energize the mud pump and also the solenoid operated air valve 27, the latter cutting off air to the pneumatic instrument and to the control valve 30. Control valve 30 will return to inoperative position so as to move arm 31 to the left causing the mud supply to be by-passed to the tank and the water supply to be opened, and venting the same. Next, contacts 81 will open, stopping the main drive, followed by contacts 83 to shut off the air compressor. Thereafter, contacts 84 will open to de-energize the water pump, followed by contacts 82 to de-energize the variable hydraulic drive arrangement. Lastly, contacts 75 will open to de-energize the timer motor 77, disengage the timer clutch 74, and de-energize control relay CR1. De-energization of CR1 opens relay contacts CR1a, CR1b. The device then is in condition for a subsequent operation, the sequence having been such that mud is shut off before the water is shut off so as to clean the separator during shut-down.

Figure 3:
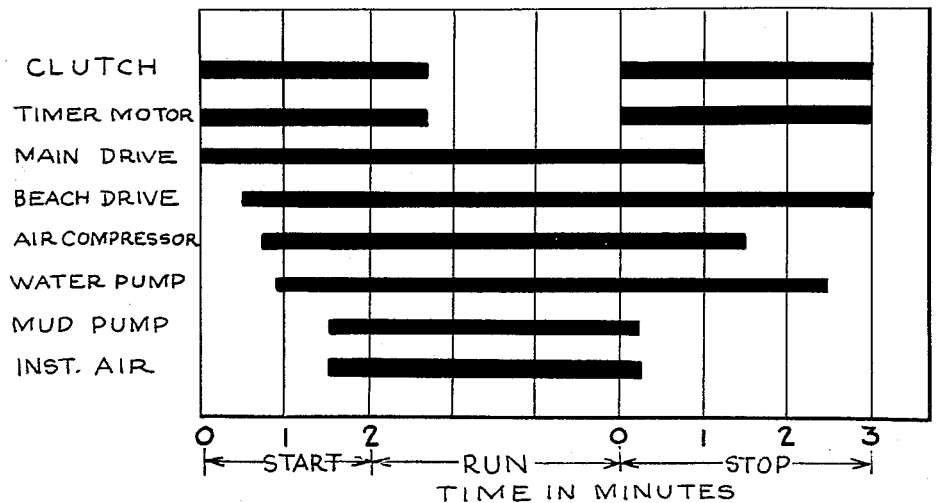
Fig. 3 is a chart showing one cycle which can be used.
Figure 4:
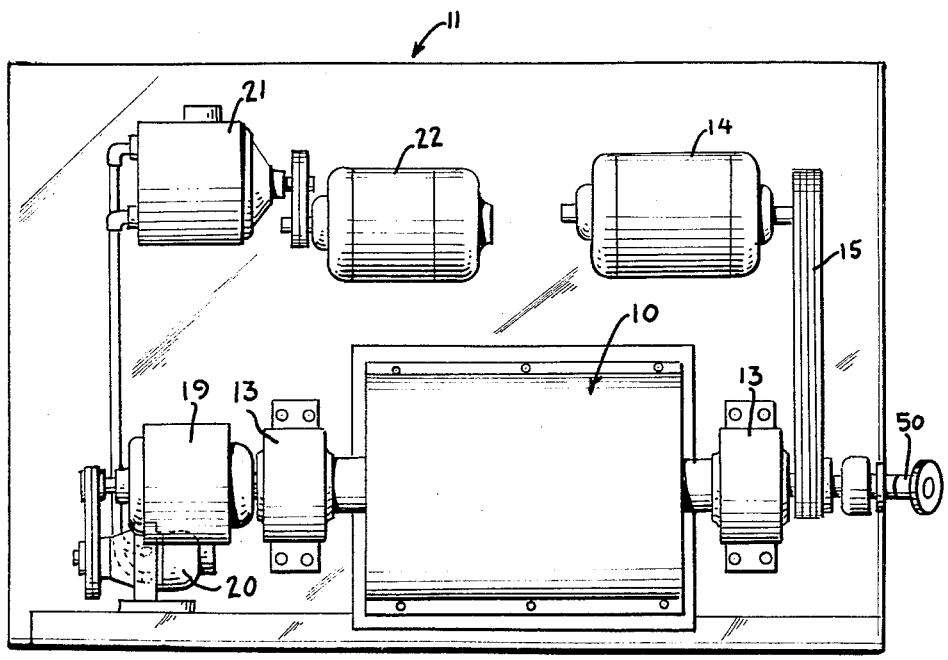
Fig. 4 is a plan view of one arrangement of the operating parts.

Fig. 3 is a chart showing the sequence control following the circuit arrangement just described. It should be apparent, of course, that various sequences can be used or that the apparatus can function in other manners. Also other control elements can be employed. Other variations can be made in details of the invention and it can be used for other purposes when similar separation based on particle mass is desired without departing from the spirit thereof except as defined in the appended claims.

What is claimed is:

1. A control system for treatment of drilling mud or the like to control the weight of mud including a liquid-solid rotary separator having drive means, fluid pump and motor means associated with said drive means, a mud pump for feeding drilling mud to said separator, mud valve means controlling flow from said pump to said separator, a water pump for feeding water to said separator, water valve means in the outlet of said water pump for controlling water flow to said separator, control means operating said valve means for changing the proportion of mud and water fed to said separator, and means connected to said control means and responsive to torque in said fluid pump drive means for operating said control means to increase flow of water in relation to mud as said torque increases.

2. A control system for treatment of drilling mud to control weight thereof, including a continuous horizontal liquid-solid rotary separator having a differential drive means, a fluid pump drive mechanism connected with said drive means, mud pump means for feeding drilling mud to said separator, mud valve means controlling flow from said pump to said separator, a water pump means for feeding water to said separator, water valve means in the outlet of said water pump for controlling water flow to said separator, control means operating said valve means for changing the proportion of mud and water fed to said separator, and means connected to said control means and responsive to pressure of fluid in said fluid drive mechanism for operating said control means to increase the flow of water in relation to mud as said pressure increases.

3. A control system for treatment of drilling mud, comprising a continuous horizontal liquid-solid rotary classifier mechanism including a differential drive means and a fluid pump drive and motor means for operating said drive means, a mud pump for feeding drilling mud to said separator from supply means, mud valve means controlling flow from said pump to said separator and to said supply means, a water pump means for feeding water to said classifier, water valve means in the outlet of said liquid pump for controlling water flow to said separator, control means connected to said valve means for operating said valves to change the proportion of mud and water fed to said separator, and means connected to said control means and responsive to pressure of liquid of said fluid pump drive means and thereby the torque for operating said control means to incdease flow of water in relation to mud as said pressure increases.

4. A control system for treatment of drilling mud to control the weight of mud including a liquid-solid rotary separator having drive means, fluid pump and motor means associated with said drive means, a mud pump for feeding drilling mud to said separator, mud valve means controlling flow from said pump to said seperator, a water pump for feeding water to said separator, water valve means in the outlet of said water pump for controlling water flow to said separator, control means operating said valve means for changing the proportion of mud and water fed to said separator, means connected to said control means and responsive to torque in said fluid pump drive means for operating said control means to increase flow of water in relation to mud as said torque increases, and switch circuit means activating said control means in one sequence in starting up and in a different sequence upon shutting down.

5. A control system for treatment of drilling mud to control the weight of mud including a liquid-solid rotary separator having drive means, fluid pump and motor means associated with said drive means, a mud pump for feeding drilling mud to said separator, mud valve means controlling flow from said pump to said separator, a water pump for feeding water to said separator, water valve means in the outlet of said water pump for controlling water flow to said separator, control means operating said valve means for changing the proportion of mud and water fed to said separator, and pneumatically operated means connected to said control means and responsive to torque in said fluid pump drive means for operating said control means to increase flow of water in relation to mud as said torque increases.

6. A control system for treatment of drilling mud to control the weight of mud including a liquid-solid rotary separator having drive means, fluid pump and motor means associated with said drive means, a mud pump for feeding drilling mud to said separator, mud valve means controlling flow from said pump to said separator, a water pump for feeding water to said separator, water valve means in the outlet of said water pump for controlling water flow to said separator, control means operating said valve means for changing the proportion of mud and water fed to said separator, and pneumatically operated means connected to said control means and responsive to torque in said fluid pump drive means for operating said control means to increase flow of water in relation to mud as said torque increases, and switch circuit means activating said control means in one sequence in starting up and in a different sequence upon shutting down.

7. A control system for treatment of drilling mud to control weight thereof, including a continuous horizontal liquid-solid rotary separator having a differential drive means, a fluid pump drive mechanism connected with said drive means, mud pump means for feeding drilling mud to said separator, mud valve means controlling flow from said pump to said separator, water pump means for feeding water to said separator, water valve means in the outlet of said water pump for controlling water flow to said separator, control means operating said valve means for changing the proportion of mud and water fed to said separator, pneumatic means connected to said control means and responsive to pressure of fluid in said fluid drive mechanism for producing a pneumatic signal, and means operating said control means in response to said signal to control flow of water in relation to mud as said fluid pressure changes.

8. A control system for treatment of drilling mud to control weight thereof, including a continuous horizontal liquid-solid rotary separator having a differential drive means, a fluid pump drive mechanism connected with said drive means, mud pump means for feeding drilling mud to said separator, mud valve means controlling flow from said pump to said separator, water pump means for feeding water to said separator, water valve means in the outlet of said water pump for controlling water flow to said separator, control means operating said valve means for changing the proportion of mud and water fed to said separator, pneumatic means connected to said control means and responsive to pressure of fluid in said fluid drive mechanism for producing a pneumatic signal, means operating said control means in response to said signal to control flow of water in relation to mud as said fluid pressure changes and means shutting off mud flow to said separator and feeding water thereto as said system is shut down.

9. A control system for treatment of drilling mud, comprising a continuous horizontal liquid-solid rotary classifier mechanism including a differential drive means and a fluid pump drive and motor means for operating said drive means, a shell drive means for said classifier, a mud pump for feeding drilling mud to said separator from supply means, mud valve means controlling flow from said pump to said separator and to said supply means, water pump means for feeding water to said classifier, water valve means in the outlet of said water pump for controlling water flow to said separator, control means connected to said valve means for operating said valves to change the proportion of mud and water fed to said separator, means connected to said control means and responsive to pressure of liquid of said fluid pump drive means and thereby the torque for operating said control means to increase flow of water in relation to mud as said pressure increases, and timer mechanism which upon activation sequentially starts said shell drive means, said differential drive means, said water pump means, and said mud pump.

10. A control system for treatment of drilling mud, comprising a continuous horizontal liquid-solid rotary classifier mechanism including a differential drive means and a fluid pump drive and motor means for operating said drive means, a shell drive means for said classifier, a mud pump for feeding drilling mud to said separator from supply means, mud valve means controlling flow from said pump to said separator and to said supply means, water pump means for feeding water to said classifier, water valve means in the outlet of said water pump for controlling water flow to said separator, control means connected to said valve means for operating said valves to change the proportion of mud and water fed to said separator, means connected to said control means and responsive to pressure of liquid of said fluid pump drive means and thereby the torque for operating said control means to increase flow of water in relation to mud as said pressure increases, and timer mechanism which upon activation sequentially starts said shell drive means, said differential drive means, said water pump means, and said mud pump and upon deactivation sequentially shuts off said mud pump, said shell drive, said water pump and said differential drive means.

11. A control system for treatment of drilling mud, comprising a continuous horizontal liquid-solid rotary classifier mechanism including a differential drive means and a fluid pump drive and motor means for operating the said drive means, a shell drive means for said classifier, a mud pump for feeding drilling mud to said separator from supply means, mud valve means controlling flow from said pump to said separator and to said supply means, water pump means for feeding water to said classifier, water valve means in the outlet of said water pump for controlling water flow to said separator, control means connected to said valve means for operating said valves to change the proportion of mud and water fed to said separator, pneumatic control means connected to said control means and responsive to pressure of liquid of said fluid pump drive means and thereby the torque for operating said control means to increase flow of water in relation to mud as said pressure increases, said pneumatic means providing an air signal, an air supply, and timer mechanism which upon activation sequentially starts said shell drive means, said differential drive means, said air supply, said water pump means, and said mud pump and upon deactivation sequentially shuts off said mud pump, said shell drive, said water pump and said differential drive means.

References Cited in the file of this patent

UNITED STATES PATENTS

| | | |
|---|---|---|
| 2,170,786 | McElroy | Aug. 22, 1939 |
| 2,532,792 | Svensjo | Dec. 5, 1950 |
| 2,770,247 | Huston | Nov. 13, 1956 |
| 2,790,553 | Bange | Apr. 30, 1957 |

FOREIGN PATENTS

| | | |
|---|---|---|
| 428,188 | Germany | May 8, 1935 |

OTHER REFERENCES

McGhee: Oil and Gas Journal, vol. 53, October 1954, pages 134–136.